United States Patent [19]
Whitfield

[11] Patent Number: 6,151,790
[45] Date of Patent: Nov. 28, 2000

[54] WATERSTOP JOINING TOOL

[76] Inventor: Jeffrey A. Whitfield, 1036 Sessions Rd., Elgin, S.C. 29045

[21] Appl. No.: 09/208,754

[22] Filed: Dec. 10, 1998

[51] Int. Cl.[7] .................................. G01B 5/25; E04B 1/68
[52] U.S. Cl. .................................. 33/533; 33/613; 52/396
[58] Field of Search .................................. 33/412, 529, 533, 33/613, 645, 562; 52/396

[56] References Cited

U.S. PATENT DOCUMENTS

| | | | |
|---|---|---|---|
| D. 271,660 | 12/1983 | Elmore et al. | |
| 3,711,947 | 1/1973 | Mason | 30/179 |
| 3,835,616 | 9/1974 | Van Wieringen | 403/402 |
| 3,872,761 | 3/1975 | Gutowski et al. | 83/767 |
| 3,879,067 | 4/1975 | Keyser | 285/110 |
| 4,059,935 | 11/1977 | Faid | 52/396 |
| 4,064,672 | 12/1977 | Faid et al. | 52/396 |
| 4,285,180 | 8/1981 | Hinton et al. | 52/396.03 |
| 4,437,375 | 3/1984 | Elmore et al. | 83/762 |
| 4,539,064 | 9/1985 | Andruchiw et al. | 156/379.7 |
| 4,646,801 | 3/1987 | Hines | 144/375 |
| 4,736,523 | 4/1988 | Hanning | 33/42 |
| 4,740,404 | 4/1988 | Otsugu et al. | 52/396 |
| 4,741,235 | 5/1988 | Price | 83/870 |
| 4,867,835 | 9/1989 | Poole | 156/507 |
| 4,919,384 | 4/1990 | Grimberg | 248/646 |
| 4,955,142 | 9/1990 | Rieck | 33/613 |
| 5,129,153 | 7/1992 | Burns, Sr. | 33/562 |
| 5,176,058 | 1/1993 | Skelly | 83/415 |
| 5,329,094 | 7/1994 | Murphy et al. | 219/243 |
| 5,375,386 | 12/1994 | Goad | 52/396 |
| 5,737,889 | 4/1998 | Habberstad et al. | 52/396 |
| 5,933,975 | 8/1999 | Pate | 33/533 |

FOREIGN PATENT DOCUMENTS 904015  8/1962  United Kingdom.

*Primary Examiner*—Christopher W. Fulton
*Assistant Examiner*—Quyen Doan
*Attorney, Agent, or Firm*—Richard C. Litman

[57] ABSTRACT

The waterstop joining tool is a two piece tool in which each piece is a nonsuperimposable mirror image of the other piece. Each piece is composed of a flat, planar body having depending side flanges defining a bottom channel adapted for sliding engagement with a section of waterstop. One end of each piece is formed at a 90° angle with respect to the longitudinal axis of the tool, and the opposite end is formed at a 45° angle, both ends having a vertical flange extending superiorly to the plane of the body. The body of each piece is bisected by an arch along the medial longitudinal axis, the arch being adapted for supporting the walls of the center bulb of the waterstop. In an alternative embodiment, each piece is arched on both sides, and optionally hinged to a bottom tool, to accommodate waterstop sections having a dumbbell shape in cross section. In use, the tool pieces are used as templates to cut the ends of two waterstop sections at either 90° or 45° angles. A heating iron is applied to the ends of the waterstop sections to create meltback, the two ends of the waterstop are approximated, and the two pieces of the tool are pressed together, the vertical flanges compressing the meltback into a uniform ridge, and held until the waterstop sections cool into a rigid joint.

11 Claims, 5 Drawing Sheets

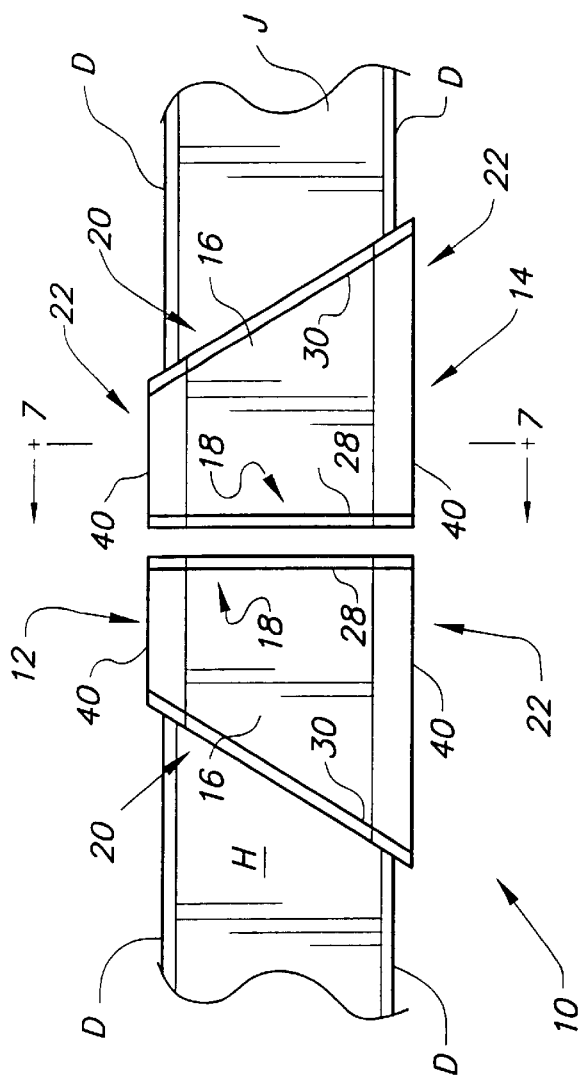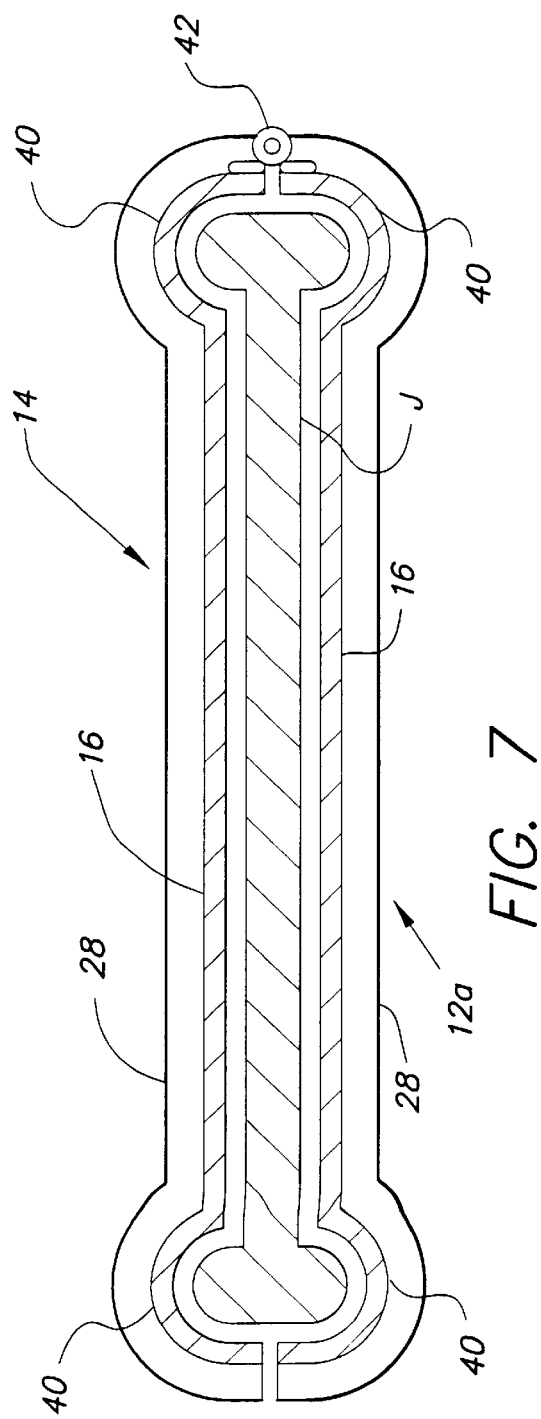

WATERSTOP JOINING TOOL

BACKGROUND OF THE INVENTION

1. Field of the Invention

The present invention relates to a joining tool, and particularly to a tool for aligning and joining sections of waterstop at a 90° angle, or end-to-end at a 180° angle, the edges of the waterstop being cut at a 45° and 90°, respectively, with respect to each longitudinal axis.

2. Description of the Related Art

Waterstops are typically used in the construction of concrete structures used for the containment of fluids, such as dams, water treatment plants, chemical refineries, etc., and also in highway construction. Waterstops provide a watertight seal between concrete slabs. Although waterstops may be made from rubber, in recent years waterstops have been made from thermoplastic materials, such as polyvinyl chloride (PVC), having high tensile strength and elongation. An example of waterstop construction is shown in U.S. Pat. No. 4,285,180, issued Aug. 25, 1981 to Hinton, et al.

Waterstops are placed at the junction between adjacent concrete slabs, one end of each section being placed each of the slabs between pours. It is frequently necessary to join one section of waterstop to another using conventional techniques for welding plastics. While some sections of waterstop must be butted together end to end, still other joints between different sections of waterstop must be at a 90° angle to each other, the edges of the sections being mitred at a 45° angle. It is important to maintain a clean, uniform seam at the joints in order to prevent water seepage or damage at the joints due to hydrostatic pressure.

The typical procedure for joining sections of waterstops involves cutting the sections at the required angle, usually with the aid of a mitre box. The ends of the two sections are then heated simultaneously. The ends are then pushed together and held in contact with each other for a sufficient period of time for the joint to cool and harden, a seam being formed at the joint. There are some problems associated with the procedure. Frequently during cutting in the mitre box or during the process of heating and pressing the two sections together, the center bulb of the waterstop sections becomes deformed due to a lack of support for the sidewalls of the bulb. It also may be difficult to manually align the ends of the sections without a template or guide due to variations in the thickness and width of the sections, or the softness and malleability of the heated ends of the sections.

Such problems may lead to failure of the joint. There is therefore a need for a tool which may be used as a template in cutting sections of waterstop at either a 90° or a 45° angle. There is a further need for a tool which may be used to guide the heated ends of the waterstop sections together to for a joint at either end-to-end at a 180° angle, or at a 90° angle, compressing the heated ends of the waterstop to form a uniform raised ridge at the seam. It is further desirable that such a tool be economical to manufacture, easy to use, and portable for use at the construction site.

A few devices have been proposed for joining sections of waterstop. U.S. Pat. No. 4,539,064, issued Sep. 3, 1985 to Andruchiw, et al., describes a device for joining two sections of waterstop end-to-end with a lap joint, the device being a jig enclosing the joint, with complementary slots on the top and bottom side of the jig. A router or other cutting device is used to cut complementary rebates on the top and bottom surfaces of the waterstop, each of the rebates extending to one-half the thickness of the two sections. The two sections are approximated into a lap joint with an electric heating element placed between the two sections, and a current is passed through the heating element in order to fuse the sections together. The device is not adapted for forming joints with the edges mitred at a 45° angle.

U.S. Pat. No. 4,867,835, issued Sep. 19, 1989 to W. J. Poole, teaches an apparatus for splicing waterstops comprising a table with two moveable sections spring biased towards each other and a heating element which may be interposed between cut ends of the waterstops. The work pieces are clamped to the table top by clamps having differently shaped feet for different cross-sectional shapes of waterstop. A mitre joint may be formed by clamping the pieces at an angle, presumably insuring proper alignment by eyeballing the joint.

U.S. Pat. No. 5,329,094, issued Jul. 12, 1994 to Murphy, et al., shows a radiant heater for joining sections of waterstop, the radiant heater having two quartz heating tubes disposed horizontally and stacked in a column with reflectors disposed above and below the quartz tubes. Heated is radiated laterally to heating zones in order to melt the edges of the waterstop sections, which are then joined and cooled. The invention is not specifically directed to templates for cutting and joining waterstop sections at an angle to one another.

Various general purpose mitre boxes and corner clamps, particularly for carpentry and woodworking, are known, such as the devices shown in U.S. Des. Pat. No. 271,660, issued Dec. 6, 1983 to Elmore, et al., U.S. Pat. No. 3,835,616, issued Sep. 17, 1974 to G. L. Van Wieringen, U.S. Pat. No. 3,872,761, issued Mar. 25, 1975 to Gutowski, et al., U.S. Pat. No. 4,437,375, issued Mar. 29, 1984 to Elmore, et al., and U.S. Pat. No. 4,646,801, issued Mar. 3, 1987 to T. E. Hines.

Other template devices for cutting and splicing various workpieces include U.S. Pat. No. 3,711,947, issued Jan. 23, 1973 to J. R. Mason (shears and guide for cutting beveled edges in automobile molding); U.S. Pat. No. 4,736,523, issued Apr. 12, 1988 to J. Hanning (saw guide for making cross cuts with a portable saw); U.S. Pat. No. 4,741,235, issued May 3, 1988 to J. G. Price (jig for cutting and splicing conveyor belts at acute angle other than 90°); U.S. Pat. No. 4,919,384, issued Apr. 24, 1990 to G. Grimberg (guide for portable cutting device including rails and a slidable carriage); U.S. Pat. No. 5,176,058, issued Jan. 5, 1993 to N. E. Skelly (fixture used with a rip fence and a table saw); and United Kingdom Patent No. 904,015, published Aug. 22, 1962 (cutting and splicing device for cutting film at 90° angle or recording tape at 45° angle).

None of the above inventions and patents, taken either singularly or in combination, is seen to describe the instant invention as claimed. Thus a waterstop joining tool solving the aforementioned problems is desired.

SUMMARY OF THE INVENTION

The waterstop joining tool is a two piece tool in which each piece is a nonsuperimposable mirror image of the other piece. Each piece is composed of a flat, planar body having depending side flanges defining a bottom channel adapted for sliding engagement with a section of waterstop. One end of each piece is formed at a 90° angle with respect to the longitudinal axis of the tool, and the opposite end is formed at a 45° angle, both ends having a vertical flange extending superiorly to the plane of the body. The body of each piece is bisected by an arch along the medial longitudinal axis, the arch being adapted for supporting the walls of the center bulb of the waterstop. In an alternative embodiment, each piece is arched on both sides, and optionally hinged to a bottom tool, to accommodate waterstop sections having a dumbbell shape in cross section. In use, the tool pieces are used as templates to cut the ends of two waterstop sections at either 90° or 45° angles. A heating iron is applied to the ends of the waterstop sections to create meltback, the two ends of the waterstop are approximated, and the two pieces of the tool are pressed together, the vertical flanges compressing the meltback into a uniform ridge, and held until the waterstop sections cool into a rigid joint.

Accordingly, it is a principal object of the invention to provide a waterstop joining tool which may be used as a cutting template and joining tool for forming end-to-end and mitred joints between two sections of thermoplastic waterstop during welding of the joint.

It is another object of the invention to provide a waterstop joining tool which produces a uniform seam when welding two sections of waterstop to form an end-to-end or mitred joint by providing a two piece tool which compresses the meltback at the joint seam between two vertical flanges.

It is a further object of the invention to provide a waterstop joining tool which prevents deformation of the center bulb during cutting and welding of two waterstop sections and which also assists in aligning the two sections of waterstop during welding by providing a tool which is contoured to support the walls of the center bulb.

Still another object of the invention is to provide a waterstop joining tool which may be used for aligning waterstop sections and forming a strong seam during welding of waterstop sections and which is portable, easy to use, and economical to manufacture due to the simplicity of the parts.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 6 is an environmental, plan view of an alternative embodiment of a waterstop joining tool according to the present invention.

FIG. 7 is a section view along the line 7—7 of FIG. 6.

Similar reference characters denote corresponding features consistently throughout the attached drawings.

DETAILED DESCRIPTION OF THE PREFERRED EMBODIMENTS

Figure 1:
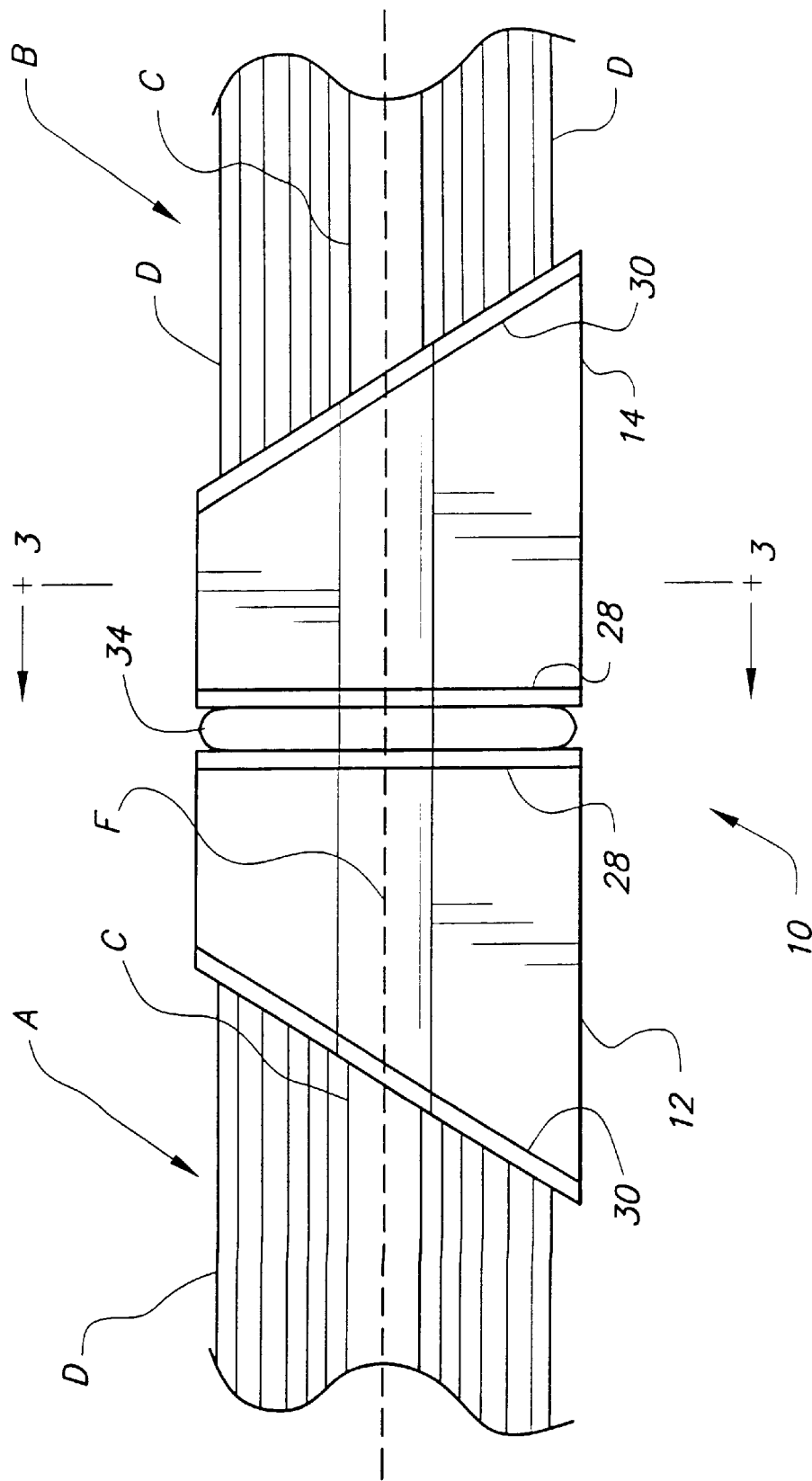
FIG. 1 is an environmental, plan view of a waterstop joining tool according to the present invention shown making an end-to-end joint.

The present invention is a waterstop joining tool, designated generally as 10 in the drawings, which may be used as a template for cutting waterstop sections at either a 90° or a 45° angle, and then forming a raised ridge seam along an end-to-end or mitred joint after heating the edges of the waterstop sections to be joined.

Figure 3:
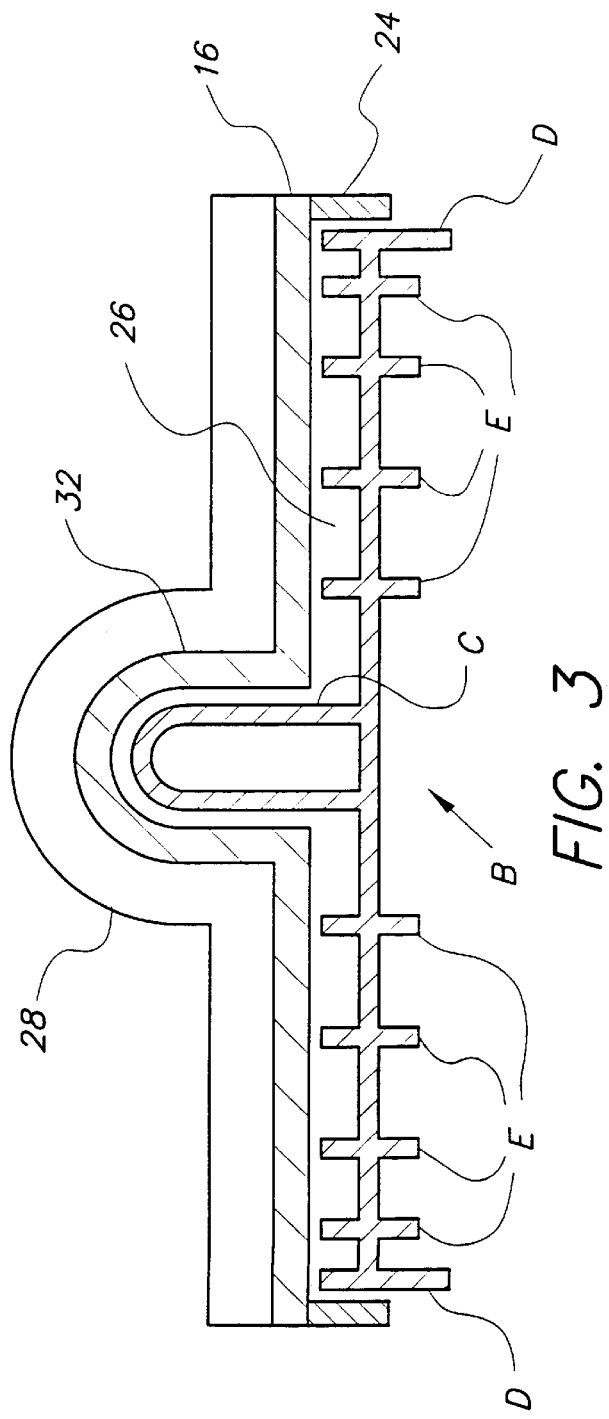
FIG. 3 is a section view along the line 3—3 of FIG. 1.

FIG. 1 shows a view of a first waterstop section A and a second waterstop section B being butted together and welded end-to-end. As shown in FIGS. 1 and 3, each waterstop section A, B is made from a thermoplastic material, usually polyvinyl chloride, and comprises a substantially flat, elongated strip having a center bulb C or Tear Webb Bulb (TWB), a pair of flanges D laterally, and a plurality of serrated ridges E between the bulb C and the flanges D as seen in a lateral section. The waterstop joining tool 10 is composed of a first or left-handed piece 12, and a second or right-handed piece 14. The first 12 and second 14 pieces are mirror images of each other, but the mirror images may not be superimposed, just as mirror images of the left and right hands may not be superimposed. The first, or left-handed piece 12, is described infra, it being understood that the structure of the second, or right-handed, piece 14 is identical except that the base angle of one edge of each piece is complementary, rather than equal.

Figure 2:
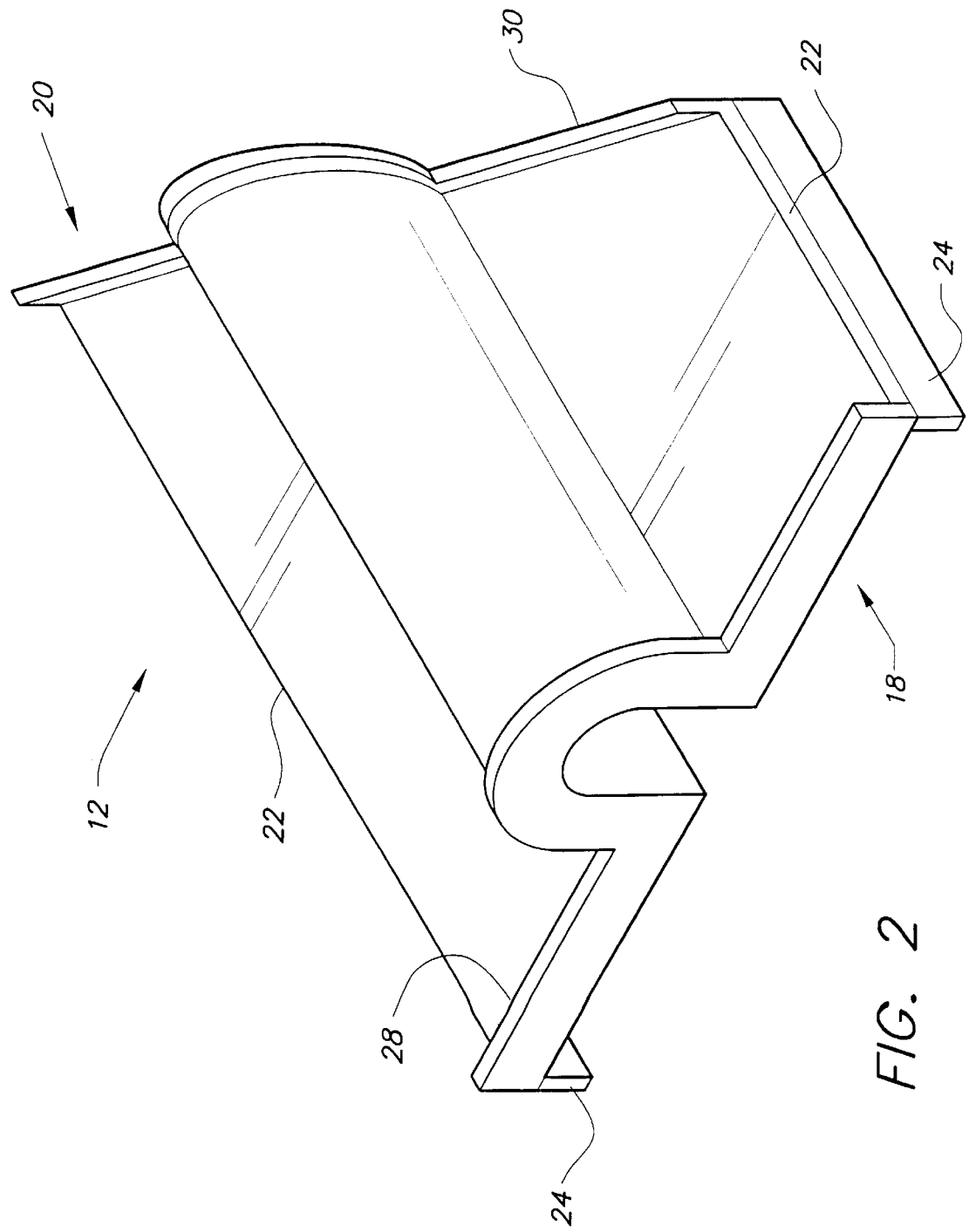
FIG. 2 is a perspective view of a first piece of a waterstop joining tool according to the present invention, the second piece being a nonsuperimposable mirror image of the first piece.

As shown in FIGS. 1, 2, and 3, each piece 12, 14 is composed of a flat, planar body 16 having a straight end 18, a mitred end 20, and a pair of opposing sides 22. In plan view, the body 16 is shaped like a trapezoid having at least one right angle. A pair of side flanges 24 depend from the opposing sides 22. The body 16 and the side flanges 24 define a bottom channel 26 for adapted for sliding engagement with a section A of waterstop, the channel 26 having a width slightly greater than the waterstop section A. The straight end 18 of the body 16 is disposed transversely between the opposing sides 22 at a right angle to a median longitudinal axis F extending through the body 16. A first vertical flange 28 extending in an upward direction is mounted at the straight end 18.

The mitred end 20 of the body 16 extends transversely across the body 16 between the opposing sides 22, defining an angle of 45° relative to the median longitudinal axis F, measured counterclockwise with 0° being due east. A second vertical flange 30 extending in an upward direction is mounted at the mitred end 20. The planar body 16 is bisected by a U-shaped arch 32 along the medial longitudinal axis F, the arch 32 being concave downward and adapted for supporting the walls of the center bulb C of the waterstop A.

The second, or right handed, piece 14 has exactly the same construction, except that the angle defined by the mitred end 20 and the median longitudinal axis F measures 135°, measured counterclockwise, 0° being due east.

In use, the waterstop joining tool 10 may be used as a template for cutting a waterstop section A, B at either a 90° or a 45° angle. The waterstop joining tool 10 is placed on top of the waterstop section A, B with the side flanges 24 to either side of the waterstop flanges D and the arch 32 supporting the center bulb C. A razor knife is used to cut the waterstop A, B, using the straight end 18 as a guide for the end to end joint, or using the mitred ends 20 of the first 12 and second 14 pieces on the different sections A and B for a mitred joint.

Figure 4:
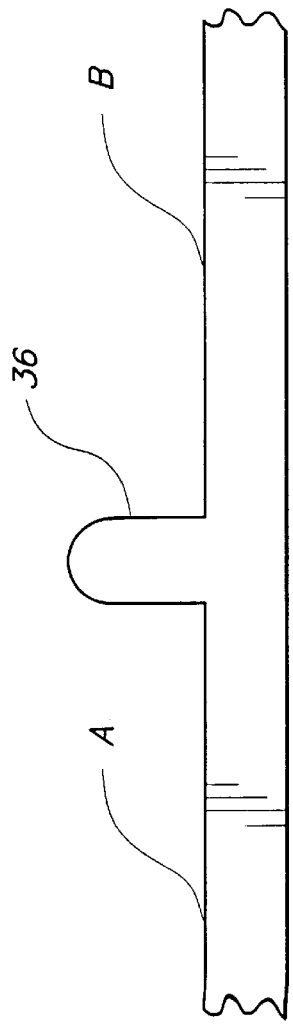
FIG. 4 is a side view of an end-to-end waterstop joint formed by using a waterstop joining tool according to the present invention as shown in FIG. 1.
Figure 5:
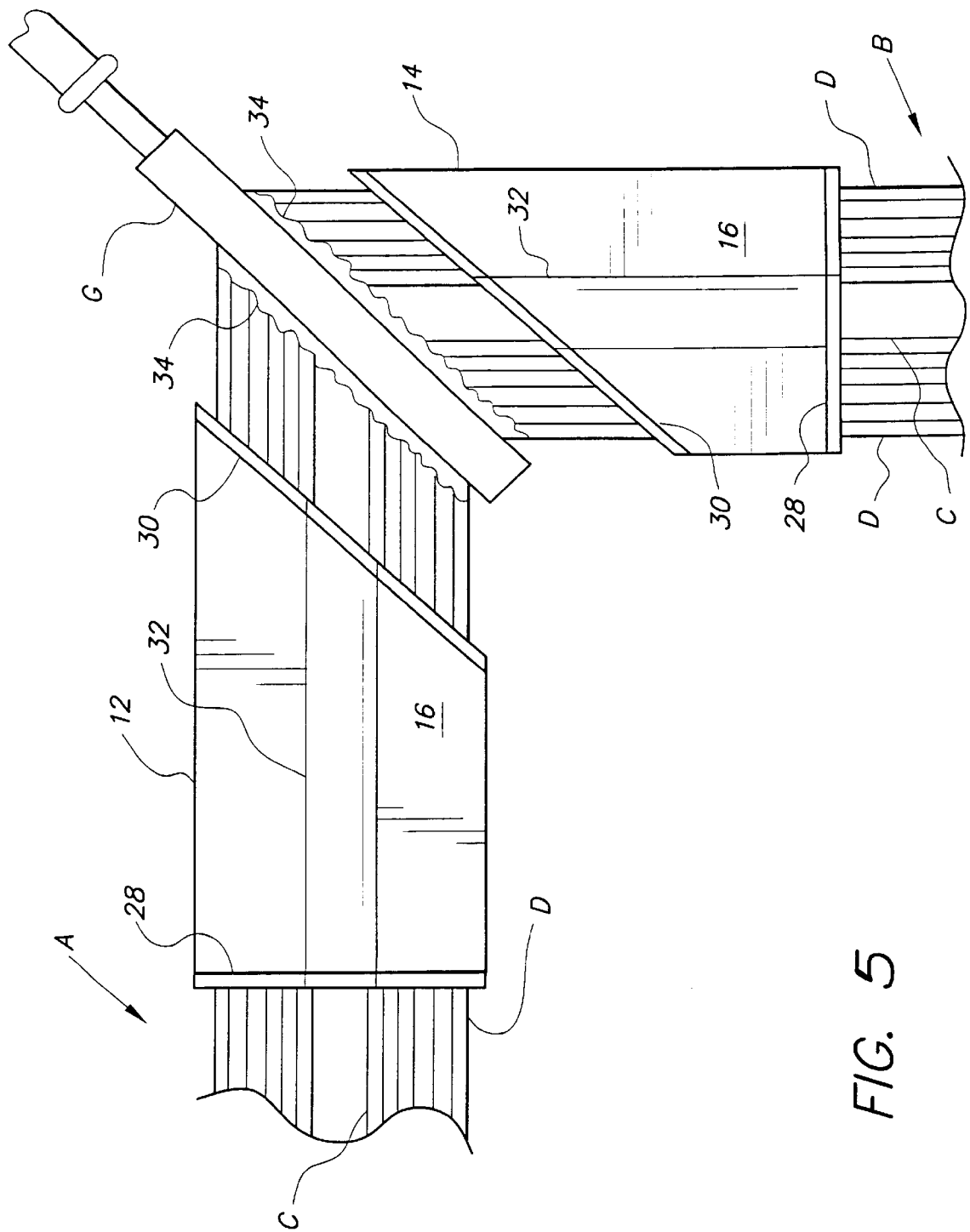
FIG. 5 is an environmental, plan view of a waterstop joining tool aligned to form a mitre joint according to the present invention.

The left-handed 12 and right-handed 14 pieces are then placed about one inch from the cut ends of the waterstop A, B, and the cut ends are abutted against a heating iron G, as shown in FIG. 5 for a mitred joint. (The mitred joint position may be obtained from FIG. 1 by rotating the left-handed piece 12 180° clockwise, and rotating the right-handed piece 90° counterclockwise.) The heat causes the PVC ends of the waterstop to soften and expand forming "meltback" regions 34 at the end of the sections A and B. When the desired degree of meltback is obtained, the cut ends of the two sections A and B are then butted against each other. The left-handed 12 and right-handed 14 pieces of the tool 10 are then slid along the waterstop sections A and B with a slight downward pressure, compressing the meltback region 34 between the vertical flanges 28 or 30 for an end-to-end or mitred joint, respectively, as shown in FIG. 1 for the end-to-end joint. The tool 10 is held against the meltback region 34 until the pieces cool. The result is a uniform, raised ridge seam 36 between the two sections A and B, as shown in FIG. 4.

A second embodiment of the tool, also designated as 10, is shown in FIGS. 6 and 7. The second embodiment of the tool 10 is designed for joints between waterstop sections H and J having no center bulb C, but having side flanges D so that the waterstop sections H and J are dumbbell shaped in cross section. In the second embodiment of the tool 10, the left-handed 12 and right-handed 14 pieces do not have an arch 32 bisecting the body 16, nor do they have side flanges 24 depending from the opposing sides 22 of the body 16. Instead, the left-handed 12 and right-handed 14 pieces have an arch 40 which is concave downward on each of the opposing sides 22. The arches 40 are adapted to conform to the contour of the flanges D of the sections H and J. In all other particulars, construction of the second embodiment of the tool 10 is identical to the construction of the first embodiment.

The manner of use of the second embodiment of the tool 10 is identical to the manner of using the first embodiment. Optionally, the left-handed 12 and right-handed 14 pieces of the second embodiment of the tool 10 may have both a top and bottom section in order to form a ridge seam 36 on both sides of the waterstop H, J. As shown in FIG. 7 the bottom of the right-handed section 14 is formed by connecting a left-handed piece 12a to the right-handed section 14 by means of a hinge 42 connecting the arches 40 so that the arches of the top section 14 are concave downward, and the arches 40 of the bottom section 12a are concave upward, the waterstop section J being sandwiched between the top 14 and bottom 12a sections with the hinge closed. The bottom (not shown) of the left-handed section 12 is formed by connecting a right-handed piece to the left-handed piece 12 by a hinge in analogous manner.

The waterstop joining tool 10 is preferably made from hardened aluminum, although it will be obvious that the tool 10 may also be made from wood, stainless steel, or various metal alloys.

It is to be understood that the present invention is not limited to the embodiments described above, but encompasses any and all embodiments within the scope of the following claims.

I claim:

1. A waterstop joining tool for joining two sections of waterstop, comprising a first piece and a second piece, said first and second pieces being nonsuperimposable mirror images of each other, said first piece and said second piece each comprising:

a) a planar body having a straight end, a mitred end, and two opposing sides, said planar body having the shape of a trapezoid having one right angle;
   b) a pair of side flanges depending from the opposing sides of said planar body, the side flanges and said planar body defining a bottom channel adapted for sliding engagement with a section of waterstop;
   c) a vertical flange extending upward along the straight end of said planar body;
   d) a vertical flange extending upward along the mitred end of said planar body; and
   e) a U-shaped arch bisecting said planar body along a median longitudinal axis of said planar body, the U-shaped arch being adapted for supporting the walls of a enter bulb of the waterstop.

2. The waterstop joining tool according to claim 1, wherein:

a) the straight ends of said planar body of said first piece and said second piece are disposed at right angles to a median longitudinal axis extending through said planar body;
   b) the mitred end of said first piece is disposed at an angle of 45° relative to a median longitudinal axis extending through said planar body, the angle being measured counterclockwise with 0° extending due east; and
   c) the mitred end of said second piece is disposed at an angle of 135° relative to a median longitudinal axis extending through said planar body, the angle being measured counterclockwise with 0° extending due east.

3. The waterstop joining tool according to claim 2, wherein said first piece and said second piece are made from hardened aluminum.

4. The waterstop joining tool according to claim 2, wherein said first piece and said second piece are made from metal alloys.

5. The waterstop joining tool according to claim 2, wherein said first piece and said second piece are made from wood.

6. A waterstop joining tool for joining two sections of waterstop, comprising a first piece and a second piece, said first and second pieces being nonsuperimposable mirror images of each other, said first piece and said second piece each comprising:

a) a planar body having a straight end, a mitred end, and two opposing sides, said planar body having the shape of a trapezoid having one right angle;
   b) a vertical flange extending upward along the straight end of said planar body;
   c) a vertical flange extending upward along the mitred end of said planar body; and
   d) a pair of arches disposed along the opposing sides of said planar body, the arches being concave downward and being adapted for conforming to the contour of side flanges of a section of waterstop.

7. The waterstop joining tool according to claim 6, wherein:

a) the straight ends of said planar body of said first piece and said second piece are disposed at right angles to a median longitudinal axis extending through said planar body;
   b) the mitred end of said first piece is disposed at an angle of 45° relative to a median longitudinal axis extending through said planar body, the angle being measured counterclockwise with 0° extending due east; and
   c) the mitred end of said second piece is disposed at an angle of 135° relative to a median longitudinal axis extending through said planar body, the angle being measured counterclockwise with 0° extending due east.

8. The waterstop joining tool according to claim 7, wherein:

a) said first piece further comprises a top section and a bottom section, said bottom section having the shape of said second piece, said first piece further comprising a hinge connecting the top section and the bottom section, the arches of said top section being concave downward and the arches of said bottom section being concave upward; and b) said second piece further comprises a top section and a bottom section, said bottom section having the shape of said first piece, said second piece further comprising a hinge connecting the top section and the bottom section, the arches of said top section being concave downward and the arches of said bottom section being concave upward.

9. The waterstop joining tool according to claim 7, wherein said first piece and said second piece are made from hardened aluminum.

10. The waterstop joining tool according to claim 7, wherein said first piece and said second piece are made from metal alloys.

11. The waterstop joining tool according to claim 7, wherein said first piece and said second piece are made from wood.

* * * * *